(12) United States Patent
Juan et al.

(10) Patent No.: US 10,298,048 B1
(45) Date of Patent: May 21, 2019

(54) WIRELESS CHARGING SYSTEM AND CHARGING CONTROL METHOD FOR DYNAMICALLY ADJUSTING OUTPUT POWER

(71) Applicant: MEDIATEK INC., Hsin-Chu (TW)

(72) Inventors: Kuan-Kai Juan, Hsinchu County (TW); Li-Ting Tsai, Hsinchu (TW)

(73) Assignee: MediaTek Inc., Hsin-Chu (TW)

( * ) Notice: Subject to any disclaimer, the term of this patent is extended or adjusted under 35 U.S.C. 154(b) by 213 days.

(21) Appl. No.: 14/642,765

(22) Filed: Mar. 10, 2015

Related U.S. Application Data

(60) Provisional application No. 61/980,037, filed on Apr. 15, 2014.

(51) Int. Cl.
*H02J 7/02* (2016.01)
*H02J 7/00* (2006.01)

(52) U.S. Cl.
CPC .............. *H02J 7/025* (2013.01); *H02J 7/007* (2013.01)

(58) Field of Classification Search
CPC .................................. H02J 7/007; H02J 7/025
USPC .................................. 320/108, 140, 145, 163
See application file for complete search history.

(56) References Cited

U.S. PATENT DOCUMENTS

| | | | |
|---|---|---|---|
| 8,513,916 B2 | 8/2013 | Yang | |
| 8,541,975 B2 | 9/2013 | Park | |
| 2003/0102845 A1* | 6/2003 | Aker | H02J 7/0042 320/139 |
| 2007/0247883 A1 | 10/2007 | Belyanin | |
| 2010/0001683 A1 | 1/2010 | Huang | |
| 2011/0009057 A1 | 1/2011 | Saunamaki | |
| 2011/0163713 A1 | 7/2011 | Wang | |
| 2012/0223674 A1 | 9/2012 | Choi | |
| 2013/0082647 A1 | 4/2013 | Yoon | |
| 2013/0082649 A1 | 4/2013 | Lee | |
| 2013/0082650 A1 | 4/2013 | Lee | |
| 2013/0094598 A1* | 4/2013 | Bastami | H02J 5/005 375/259 |
| 2013/0127405 A1 | 5/2013 | Scherer | |
| 2013/0154560 A1* | 6/2013 | Walley | H01M 2/0267 320/108 |
| 2013/0234658 A1* | 9/2013 | Endo | H02J 7/025 320/108 |

* cited by examiner

*Primary Examiner* — Edward Tso
*Assistant Examiner* — Aaron Piggush
(74) *Attorney, Agent, or Firm* — Wolf, Greenfield & Sacks, P.C.

(57) ABSTRACT

A wireless charging system is provided. The wireless charging system includes a wireless power receiver circuit and a power management unit. The wireless power receiver circuit is arranged for adjusting an output power according to charging information. The power management unit is coupled to the wireless power receiver circuit, and is arranged for receiving the output power from the wireless power receiver circuit to charge an energy source, and transmitting the charging information to the wireless power receiver circuit.

18 Claims, 2 Drawing Sheets

US 10,298,048 B1

WIRELESS CHARGING SYSTEM AND CHARGING CONTROL METHOD FOR DYNAMICALLY ADJUSTING OUTPUT POWER

CROSS REFERENCE TO RELATED APPLICATIONS

This application claims the benefit of U.S. provisional application No. 61/980,037, filed on Apr. 15, 2014, the contents of which are incorporated herein by reference.

BACKGROUND

The disclosed embodiments of the present invention relate to wireless charging, and more particularly, to a wireless charging system capable of dynamically adjusting an output power of a wireless charging module, and a related control method.

The wireless charging technique uses a change in the magnetic flux to transfer power from the primary coil (the transmission side) to the secondary coil (the reception side). The user needs not use a power cord to charge a portable electronic apparatus (e.g. a mobile phone). As a voltage induced in the coils is greater than a voltage generated using wired charging, the conventional wireless charging system utilizes a specific circuit to adjust the induced voltage to a specific voltage provided by a wired charging module (e.g. 5 volts). However, the use of the specific circuit causes energy losses and reduces system efficiency. Further, additional heat is generated, resulting in an increase in temperature of a handheld device.

Thus, there is a need for a novel wireless charging system to solve the above problems.

SUMMARY

In accordance with exemplary embodiments of the present invention, a wireless charging system, which includes a power management unit capable of dynamically adjust an output power of a wireless charging module, and a related control method are proposed to solve the above problems.

According to an embodiment of the present invention, an exemplary wireless charging system is disclosed. The exemplary wireless charging system comprises a wireless power receiver circuit and a power management unit. The wireless power receiver circuit is arranged for adjusting an output power according to charging information. The power management unit is coupled to the wireless power receiver circuit, and is arranged for receiving the output power from the wireless power receiver circuit to charge an energy source, and transmitting the charging information to the wireless power receiver circuit.

According to an embodiment of the present invention, an exemplary control method of a wireless charging system is disclosed. The wireless charging system comprises a power management unit, and the power management unit is arranged for receiving an output power to charge an energy source. The exemplary control method comprises the following steps: utilizing the power management unit to transmit charging information; and adjusting the output power according to the charging information.

As providing electrical power according to charging information transmitted from a power management unit, the proposed wireless charging system and related control method may not only increase charging efficiency and reduce temperature of a charged mobile phone, but also meet different charging requirements.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "coupled" is intended to mean either an indirect or direct electrical connection. Accordingly, if one device is electrically connected to another device, that connection may be through a direct electrical connection, or through an indirect electrical connection via other devices and connections.

As the proposed wireless charging system includes a power management unit which may communicate with a wireless charging module of the proposed wireless charging system, the wireless module charging module may adaptively adjust an output power thereof according to charging information provided by the power management unit, thereby increasing wireless charging efficiency.

Figure 1:
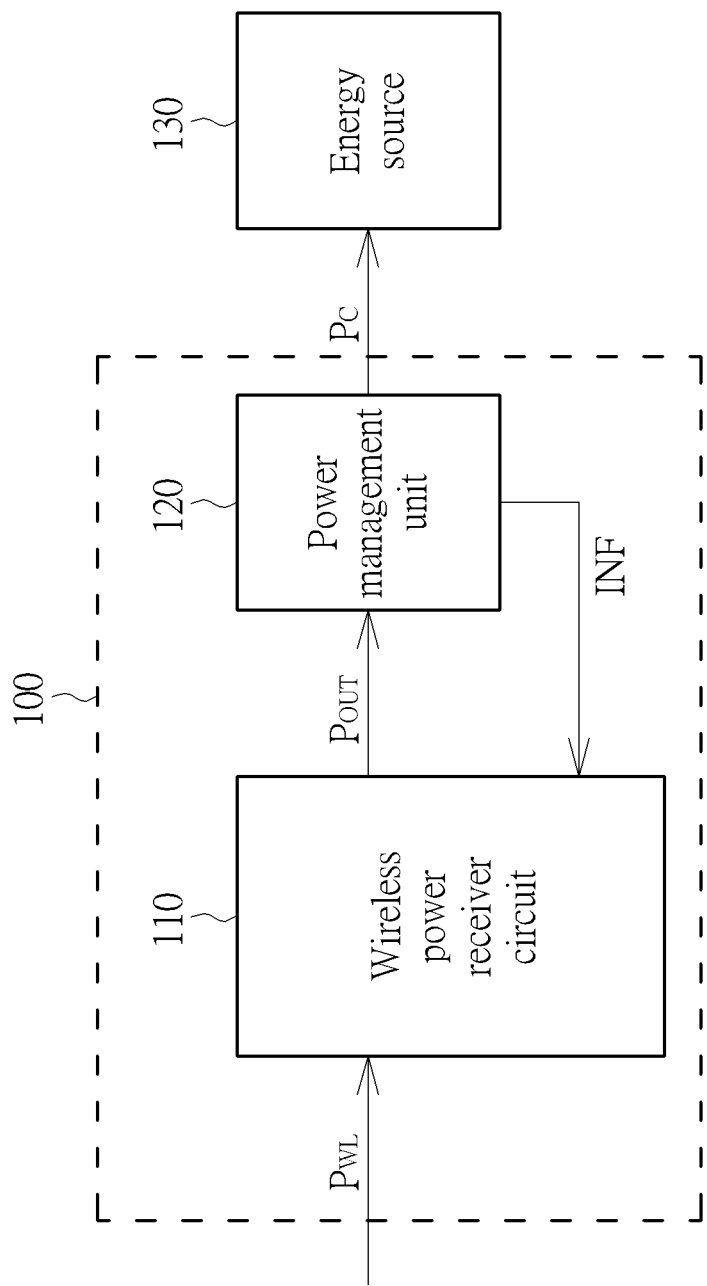
FIG. 1 is a block diagram illustrating an exemplary wireless charging system according to an embodiment of the present invention.

Please refer to FIG. 1, which is a block diagram illustrating an exemplary wireless charging system according to an embodiment of the present invention. The wireless charging system 100 may receive a wireless power $P_{WL}$ to generate a charging power $P_C$, and accordingly charge an energy source 130 (e.g. a battery). In this embodiment, the wireless charging system 100 may include a wireless power receiver circuit (or a wireless charging module) 110 and a power management unit 120. The wireless power receiver circuit 110 may receive the wireless power $P_{WL}$ to generate an output power $P_{OUT}$. The power management unit 120 is coupled to the wireless power receiver circuit 110, and may be arranged for receiving the output power $P_{OUT}$ from the wireless power receiver circuit 110 to charge the energy source 130. In addition, the power management unit 120 may transmit charging information INF to the wireless power receiver circuit 110, and the wireless power receiver circuit 110 may adjust the output power $P_{OUT}$ according to charging information INF. By way of example nut not limitation, the power management unit 120 may include a control circuit (not shown in FIG. 1), wherein the control circuit may know an input power required by the power management unit 120 according to a charging scenario of the wireless charging system 100 (e.g. a fast charging mode or a high efficiency charging mode), a charging status of the energy source 130 (e.g. the charging operation has just started or has been almost completed), and/or an energy level of the charging power $P_C$, and accordingly generate the charging information INF.

In this embodiment, the charging information INF may include a target range (or a target level) of the output power $P_{OUT}$. Hence, the wireless power receiver circuit 110 may adjust the energy level of the charging power $P_C$ to fall within the target range (or to the target level) according to the charging information INF transmitted from the power management unit 120. In an alternative design, the charging information INF may include other information. For example, the charging information INF may indicate a difference between the energy level of the output power $P_{OUT}$ and the target range (or the target level), and the wireless power receiver circuit 110 may refer to the difference indicated by the charging information INF to adjust an output thereof. In brief, as long as the power management unit 120 may communicate with the wireless power receiver circuit 110 such that the output power $P_{OUT}$ may be adjusted dynamically, other modifications and alternatives fall within the scope of the present invention.

As the output power $P_{OUT}$ outputted from the wireless power receiver circuit 110 may be adjusted in response to the charging information INF transmitted from the power management unit 120, the proposed charging control mechanism may not only improve wireless charging efficiency but also meet various charging requirements (e.g. fast charging or high efficiency charging). Additionally, as the power management unit 120 may communicate with the wireless power receiver circuit 110 directly, the wireless power receiver circuit 110 and the power management unit 120 may be regarded as an integrated wireless charging module. For example, the power management unit 120 may transmit the charging information INF (e.g. implemented by a command signal) through a transmission interface (e.g. an inter-integrated circuit ($I^2C$) interface, an UART interface or a serial-peripheral interface (SPI); not shown in FIG. 1) to the wireless power receiver circuit 110 to thereby dynamically adjust the output power $P_{OUT}$.

In order to adjust the output power $P_{OUT}$, the wireless power receiver circuit 110 may first adjust an energy level of the wireless power $P_{WL}$ according to the charging information INF, and then generate the output power $P_{OUT}$ according to the adjusted wireless power $P_{WL}$. Please refer to FIG. 2, which is an implementation of the wireless charging system 100 shown in FIG. 1. The wireless charging system 200 may be used for charging a battery 230 of an electronic apparatus (not shown in FIG. 2). The wireless charging system 200 may include, but is not limited to, a wireless power receiver circuit 210, a power management unit 220 and a wireless power transmitter circuit 240, wherein the wireless power receiver circuit 110, the power management unit 120 and the energy source 130 shown in FIG. 1 may be implemented by the wireless power receiver circuit 210, the power management unit 220 and the battery 230 respectively. The wireless power transmitter circuit 240 is coupled to the wireless power receiver circuit 210, and is arranged for receiving an input power $P_{IN}$ (e.g. a direct current (DC) power) to generate the wireless power $P_{WL}$. The wireless power receiver circuit 210 may receive the wireless power $P_{WL}$ to generate the output power $P_{OUT}$, and the power management unit 220 may charge the battery 230 according to the output power $P_{OUT}$.

For illustrative purposes, consider the following example where the wireless charging system 200 is used for charging a mobile phone. In this example, the wireless power transmitter circuit 240 may be disposed at a power supply side (e.g. a wireless charging pad), and the wireless power receiver circuit 210 may be disposed at a power receiver side (the mobile phone). However, a person skilled in the art should understand that the proposed charging control mechanism may be employed in other types of electronic apparatuses which can be charged in a wireless manner.

In this embodiment, the wireless power receiver circuit 210 may generate control information CS according to the charging information INF, and transmit the control information CS to the wireless power transmitter circuit 240 by using in band communication or out of band communication. Next, the wireless power transmitter circuit 240 may adjust the wireless power $P_{WL}$ according to the control information CS. In other words, the wireless power receiver circuit 210 may use the control information CS to communicate with the wireless power transmitter circuit 240, and request the wireless power transmitter circuit 240 to adjust an output thereof. By way of example but not limitation, the wireless power receiver circuit 210 may calculate a difference between the energy level of the output power $P_{OUT}$ and the target level indicated by the charging information INF to generate the control information CS. The wireless power transmitter circuit 240 may know how to adjust the wireless power $P_{WL}$ according to the control information CS.

Figure 2:
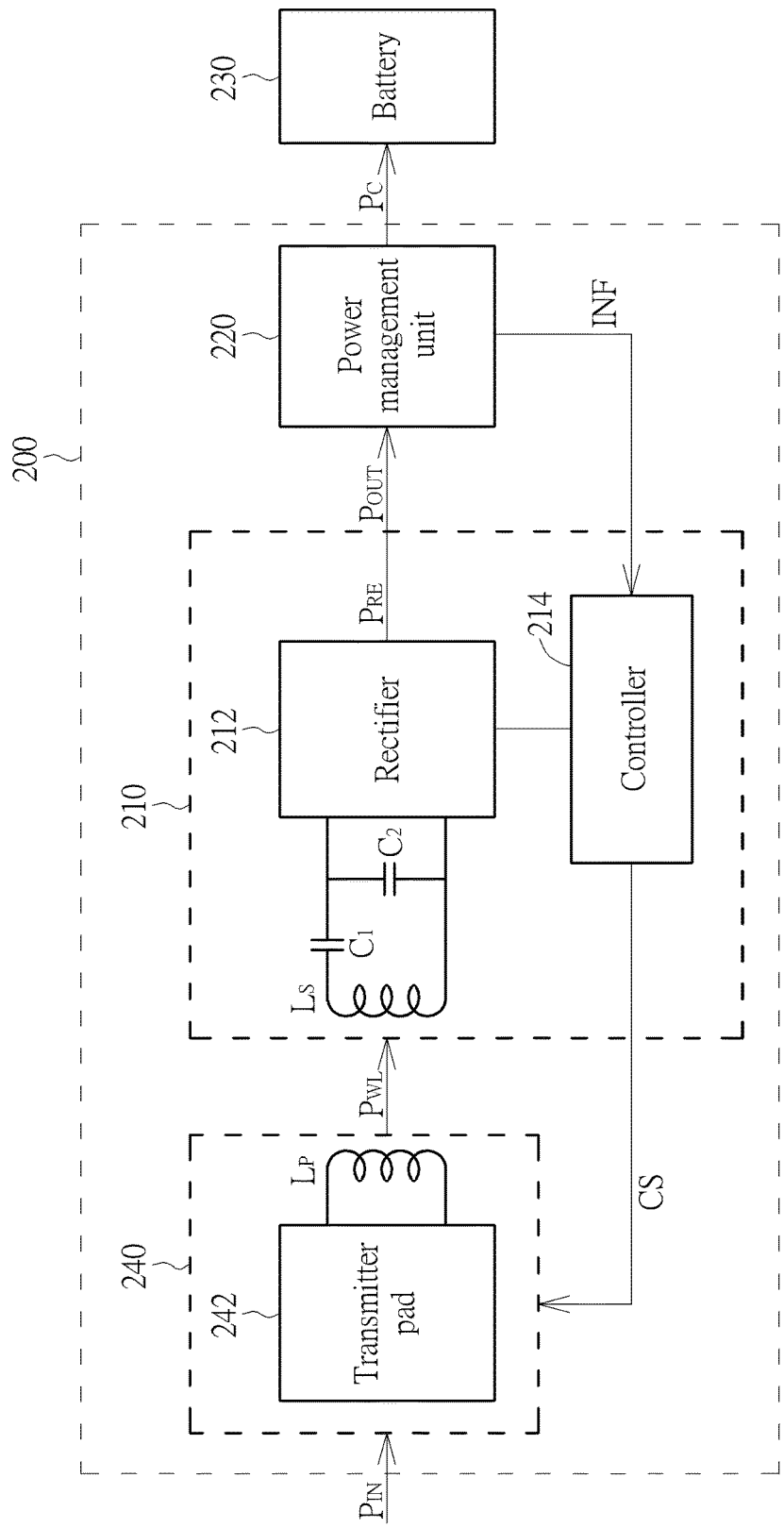
FIG. 2 is an implementation of the wireless charging system shown in FIG. 1.

In the implementation shown in FIG. 2, the wireless power transmitter circuit 240 may include, but is not limited to, a transmitter pad 242 and a coil $L_P$, and the wireless power receiver circuit 210 may include, but is not limited to, a rectifier 212, a controller 214, a coil $L_S$ and a plurality of capacitors $C_1$ and $C_2$. The transmitter pad 242 may transmit the wireless power $P_{WL}$ through the coil $L_P$, and the rectifier 212 may receive the wireless power $P_{WL}$ through the coil $L_S$ and the capacitors $C_1$ and $C_2$ to generate a rectified power $P_{RE}$. It should be noted that, as each of the output power $P_{OUT}$ of the wireless power receiver circuit 210 and the wireless power $P_{WL}$ of the wireless power transmitter circuit 240 may be adjusted dynamically, no specific circuit (e.g. a voltage regulator circuit) has to be disposed between the rectifier 212 and the power management unit 220 to adjust the rectified power $P_{RE}$. In other words, the rectifier 212 may directly output the rectified power $P_{RE}$ to the power management unit 220, and the rectified power $P_{RE}$ may be used as the output power $P_{OUT}$ received by the power management unit 220. Hence, energy losses may be greatly reduced.

The controller 214 is coupled to the rectifier 212, and may be arranged for receiving the charging information INF to generate the control information CS. The controller 214 may use the control information CS to communicate with the wireless power transmitter circuit 240, and request the wireless power transmitter circuit 240 to adjust the wireless power $P_{WL}$. By way of example but not limitation, the controller 214 may calculate a difference between an energy level of the rectified power $P_{RE}$ and the target level indicated by the charging information INF to generate the control information CS, and transmit the control information CS to the wireless power transmitter circuit 240 by using in band communication or out of band communication.

For better understanding of the present invention, consider the following scenarios in which the wireless charging system 200 operates in a high efficiency charging mode and a fast charging mode. However, this is not meant to be a limitation of the present invention. In a case where the wireless charging system 200 operates in the high efficiency charging mode, the wireless power transmitter circuit 240 may adjust the wireless power $P_{WL}$ according to the control information CS, thereby making the energy level (e.g. a voltage level) of the rectified power $P_{RE}$ to be a little bit greater than the energy level (e.g. a voltage level) of the charging power $P_C$. This may minimize power loss. By way of example but not limitation, when the battery 230 expects a voltage range of the charging power $P_C$ of 3.7 to 4.2 volts, the charging information INF transmitted by the power management unit 220 may indicate a target range of the output power $P_{OUT}$ (or the rectified power $P_{RE}$) of 3.9 to 4.4 volts. Hence, an output voltage of the wireless power receiver circuit 210 may not be fixed (e.g. 5 volts specified by wired charging), which improves the charging efficiency and reduces the temperature of the charged mobile phone.

In a case where the wireless charging system 200 operates in the fast charging mode, the wireless power transmitter circuit 240 may adjust the wireless power $P_{WL}$ according to the control information CS, thereby making the energy level (e.g. a voltage level) of the rectified power $P_{RE}$ to be greater than a specific energy level (e.g. a specific voltage level). This may shorten charging time. By way of example but not limitation, when the battery 230 expects a voltage range of the charging power $P_C$ of 3.7 to 4.2 volts, the charging information INF transmitted by the power management unit 220 may indicate that a target level of the output power $P_{OUT}$ (or the rectified power $P_{RE}$) is a specific level greater than 5 volts. Hence, charging time of the battery 230 may be greatly shortened, which reduces user's waiting time.

It should be noted that, although the output of the wireless power receiver circuit 210 is adjusted due to adjustment of the output of the wireless power transmitter circuit 240 in the implementation shown in FIG. 2, it is possible to directly adjust the output of the wireless power receiver circuit 210 according to the charging information INF. For example, in a case where a voltage regulator circuit (not shown in FIG. 2) is disposed between the rectifier 212 and the power management unit 220, the controller 214 may control the voltage regulator circuit according to the charging information INF to thereby adjust the energy level of the output power $P_{OUT}$. In brief, as long as an output power at a receiver side of a wireless charging system may be dynamically adjusted according to information transmitted from a power management unit, such modifications and alternatives obey the spirit of the present invention.

To sum up, the proposed charging control mechanism may provide electrical power according to charging information transmitted from a power management unit. The proposed wireless charging system and related control method may not only increase charging efficiency and reduce temperature of a charged mobile phone, but also meet different charging requirements.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless charging system, comprising:
a wireless power receiver circuit comprising a rectifier, the wireless power receiver circuit configured to adjust an output power of the rectifier to a target range or a target level according to charging information, wherein the charging information indicates a charging mode of the wireless charging system from a plurality of charging modes of the wireless charging system comprising a fast charging mode and a high efficiency charging mode, and the wireless power receiver circuit produces a higher output voltage when the charging information indicates the wireless charging system operates in the fast charging mode than in the high efficiency charging mode; and
a power management unit, coupled to the wireless power receiver circuit, the power management unit configured to receive the output power from the wireless power receiver circuit to charge an energy source, and configured to transmit the charging information to the wireless power receiver circuit.

2. The wireless charging system of claim 1, wherein the charging information comprises the target range or the target level of the output power.

3. The wireless charging system of claim 1, wherein the wireless power receiver circuit further generates control information according to the charging information, and the wireless charging system further comprises:
a wireless power transmitter circuit, coupled to the wireless power receiver circuit, the wireless power transmitter circuit configured to adjust a wireless power according to the control information, wherein the wireless power receiver circuit receives the wireless power to generate the output power.

4. The wireless charging system of claim 3, wherein the wireless power receiver circuit calculates a difference between an energy level of the output power and the target range or the target level indicated by the charging information to generate the control information.

5. The wireless charging system of claim 3, wherein the wireless power receiver circuit comprises:
a controller, coupled to the rectifier, the controller configured to receive the charging information to generate the control information.

6. The wireless charging system of claim 5, wherein the controller calculates a difference between an energy level of the output power of the rectifier and the target range or the target level indicated by the charging information to generate the control information.

7. A control method of a wireless charging system, the wireless charging system comprising a power management unit and a wireless power receiver circuit comprising a rectifier, the power management unit being arranged for receiving an output power of the rectifier to charge an energy source, the control method comprising:
utilizing the power management unit to transmit charging information, wherein the charging information indicates a charging mode of the wireless charging system from a plurality of charging modes of the wireless charging system comprising a fast charging mode and a high efficiency charging mode; and
adjusting the output power of the rectifier to a target range or a target level according to the charging information, wherein the output power is higher when the charging information indicates the wireless charging system operates in the fast charging mode than in the high efficiency charging mode.

8. The control method of claim 7, wherein the charging information comprises the target range or the target level of the output power.

9. The control method of claim 7, further comprising:
generating control information according to the charging information;
adjusting a wireless power according to the control information; and
receiving the wireless power to generate the output power.

10. The control method of claim 9, wherein generating the control information according to the charging information comprises:

calculating a difference between an energy level of the output power and the target range or the target level indicated by the charging information to generate the control information.

11. The control method of claim 7, wherein the charging information comprises the target range or the target level of the output power.

12. The control method of claim 9, further comprising:
transmitting the control information to a wireless power transmitter circuit that generates the wireless power.

13. A wireless charging system, comprising:
a wireless power receiver circuit comprising a rectifier, the wireless power receiver circuit configured to adjust an output power of the rectifier to a target range or a target level according to charging information; and
a power management unit, coupled to the wireless power receiver circuit, the power management unit configured to receive the output power from the wireless power receiver circuit to charge an energy source, and configured to transmit the charging information to the wireless power receiver circuit, wherein the charging information indicates a charging status of the energy source and/or a charging mode of the wireless charging system from a plurality of charging modes of the wireless charging system comprising a fast charging mode and a high efficiency charging mode, and the wireless power receiver circuit produces a higher output voltage when the charging information indicates the wireless charging system operates in the fast charging mode than in the high efficiency charging mode.

14. The wireless charging system of claim 13, wherein the charging information comprises the target range or the target level of the output power.

15. The wireless charging system of claim 13, wherein the wireless power receiver circuit further generates control information according to the charging information, and the wireless charging system further comprises:
a wireless power transmitter circuit, coupled to the wireless power receiver circuit, the wireless power transmitter circuit configured to adjust a wireless power according to the control information, wherein the wireless power receiver circuit receives the wireless power to generate the output power.

16. The wireless charging system of claim 15, wherein the wireless power receiver circuit calculates a difference between an energy level of the output power and the target range or the target level indicated by the charging information to generate the control information.

17. The wireless charging system of claim 15, wherein the wireless power receiver circuit comprises:
a controller, coupled to the rectifier, the controller configured to receive the charging information to generate the control information.

18. The wireless charging system of claim 17, wherein the controller calculates a difference between an energy level of the output power of the rectifier and the target range or the target level indicated by the charging information to generate the control information.

* * * * *